(12) United States Patent
Lindström

(10) Patent No.: US 8,491,060 B2
(45) Date of Patent: Jul. 23, 2013

(54) PLATFORM BODY

(75) Inventor: Bo Lindström, Jönäker (SE)

(73) Assignee: SSAB Technology AB, Stockholm (SE)

( * ) Notice: Subject to any disclaimer, the term of this patent is extended or adjusted under 35 U.S.C. 154(b) by 219 days.

(21) Appl. No.: 13/145,215

(22) PCT Filed: Jan. 18, 2010

(86) PCT No.: PCT/SE2010/050042
§ 371 (c)(1), (2), (4) Date: Jul. 19, 2011

(87) PCT Pub. No.: WO2010/085201
PCT Pub. Date: Jul. 29, 2010

(65) Prior Publication Data
US 2011/0278309 A1    Nov. 17, 2011

(30) Foreign Application Priority Data
Jan. 22, 2009 (SE) .................................. 0900064-7

(51) Int. Cl.
*B60P 1/00* (2006.01)
(52) U.S. Cl.
USPC ....................................................... 298/1 R
(58) Field of Classification Search
USPC ........... 298/1 R, 1 H; 296/1.01, 181.2, 181.3, 296/183.1, 183.2, 184.1
See application file for complete search history.

(56) References Cited

U.S. PATENT DOCUMENTS

| 5,662,374 A | 9/1997 | Wheeler |
| 7,025,407 B2* | 4/2006 | Medel .................... 296/183.2 |
| 2005/0093338 A1* | 5/2005 | Medel .................... 296/183.1 |

FOREIGN PATENT DOCUMENTS

| EP | 1 473 189 | 11/2004 |
| FR | 2 883 831 | 10/2006 |
| SU | 1219442 | 3/1986 |

OTHER PUBLICATIONS

International Search Report for PCT/SE2010/050042, mailed Apr. 14, 2010.
Written Opinion of the International Searching Authority for PCT/SE2010/050042, mailed Apr. 14, 2010.

\* cited by examiner

*Primary Examiner* — H Gutman
(74) *Attorney, Agent, or Firm* — Nixon & Vanderhye PC

(57) ABSTRACT

Platform body (1, 80) comprising a bottom (21) to which two opposite sides (31, 32, 41, 42, 63, 83, 84) are connected that either consist of long sides or of short sides as well as at least one additional side for the formation of a cargo volume (LV), said bottom having a bottom surface of a surface length between the opposite sides of the platform body (1, 80) that is larger than the spacing between said opposite sides, at least one part of said bottom being curved inward toward the cargo volume (LV), wherein at least one tie means (22) is mounted with one end thereof connected to one of the opposite sides of the platform body (1, 80) and with the other end thereof connected to the other opposite side of the platform body (1, 80) in order to eliminate deflection of said sides when the bottom of the platform (1, 80) is loaded by goods.

10 Claims, 2 Drawing Sheets

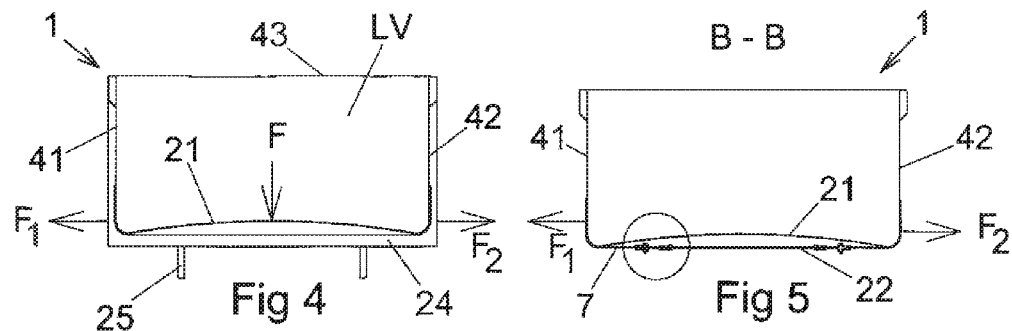
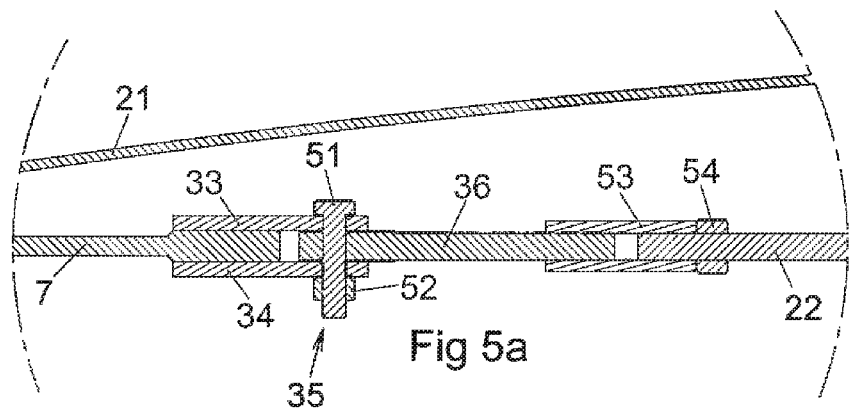
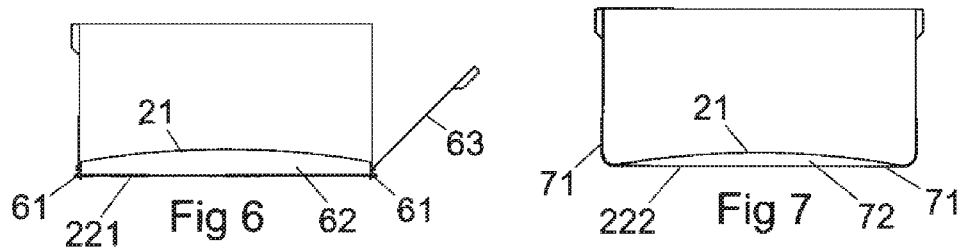
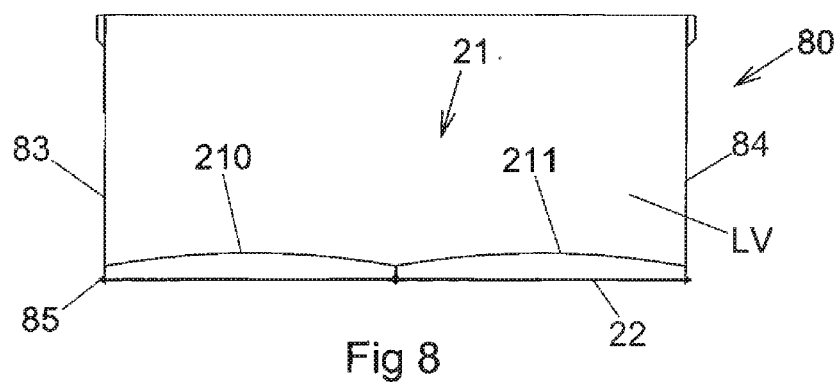

PLATFORM BODY

This application is the U.S. national phase of International Application No. PCT/SE2010/050042, filed 18 Jan. 2010, which designated the U.S. and claims priority to Swedish Application No. 0900064-7, filed 22 Jan. 2009, the entire contents of each of which are hereby incorporated by reference.

TECHNICAL FIELD

The present invention relates to the area of platform bodies of lorries or trucks intended for heavier transportations such as scrap, stone or gravel. By platform bodies in the present invention, reference is also made to load changer containers, lorry platforms, dumper bodies and the like of the traditional rectangular type of platforms.

BACKGROUND OF THE INVENTION

Platform bodies for such transportations are formed with a bottom that is subjected to great forces in the form of dynamic and static loads, above all upon loading but also upon transportation and unloading. The dynamic load causes deformation of the bottom of the platform body in the form of elastic deflection and also plastic deformation because of this deflection. Such deflections represent great stresses on weld joints between the bottom and the sides but also between two adjacent sides that limit the cargo volume. In order to eliminate such deflections and stresses, the material thickness has increased in both the walls and the bottom, which has resulted in the weight of the platform having increased considerably. In that connection, also the production cost for these platforms has increased.

THE OBJECT OF THE INVENTION

The present invention aims at providing an improved platform body having the same good function as previously known platform bodies but having a reduced weight and thereby a greater loading capacity.

An additional object of the invention is to obtain portions of the bottom of the cargo volume having an elastically resilient function in order to increase the strength by absorbing the kinetic energy upon loading, above all in adjacent welded splices.

Furthermore, the object of the invention is to minimize the deflection of opposite sides of the cargo volume because of forces above all upon loading and unloading of transported goods.

Moreover, the object is that opposite side walls should to a greater extent than previously carry the horizontal forces that arise from the platform when it is filled with cargo from above.

An object is also to provide a bottom of a platform body that is both rigid and light.

SUMMARY OF THE INVENTION

By the present invention, such as the same is defined in the independent claim, the above-mentioned objects are met. Suitable embodiments of the invention are defined in the dependent claims.

The invention concerns a platform body comprising a bottom to which two opposite sides are connected that either consist of long sides or of short sides. Moreover, at least one additional side is connected to said bottom for the formation of a cargo volume. Said bottom has a bottom surface of a surface length between the opposite sides of the platform body that is larger than the spacing between said opposite sides, at least one part of said bottom being curved inward toward the cargo volume. At least one tie means is mounted with one end thereof connected to one of the opposite sides of the platform body and with the other end thereof connected to the other opposite side of the platform body in order to eliminate deflection of said sides when the bottom of the platform is loaded by goods.

According to one embodiment of the invention, one end of the tie means is connected to an area near the connection of one side to the bottom of the platform, while the other end of the tie means is connected to an area near the connection of the other side to the bottom of the platform.

According to an additional embodiment of the invention, the tie means is placed outside the cargo volume.

The placement of the tie means is in the vicinity of the bottom of the platform body, i.e., where the stresses of said bottom on the walls are the greatest.

According to one embodiment of the invention, the ends of the tie means are connected to the sides of the platform body via a mounting part that is connected to the respective side and extends inward toward the centre of the platform body in the direction of the opposite side. By "side", reference is made to either a long side or a short side, i.e., an end wall.

According to one embodiment of the invention, the tie means is formed either as a tie-rod or as a wire. Conventional hot-galvanized tie-rods having a load-carrying capacity of 83—approx. 20 kN may, for instance, be used in connection with the present invention. The tie-rod may also be formed with a central centre part that is provided with two end parts that in turn are connected to the mounting part via a screw joint.

In other embodiments, the tie means may be formed as a plate. In such an embodiment, this plate may form at least one, possibly closed, channel between said bottom and said plate. Such a channel may be arranged for conveying warm exhaust fumes in order to avoid freezing of the transported goods.

By the fact that said bottom of the platform body is arched inward toward the cargo volume, i.e., upward, a space is obtained under the bottom that also may be used for miscellaneous cabling and hydraulic hoses.

According to one embodiment of the invention, the platform body is provided with longitudinal supporting beams through which the tie means extends without any transfer of force between the beam and the tie means.

Additional embodiments of the invention are that said bottom is formed as two bottom parts that are interconnected by, e.g., a screw joint along the centre of the platform body, each bottom part being curved inward toward the cargo volume. By "the centre of the platform body", it is, in this connection, meant the middle in the transverse direction or the middle in the longitudinal direction.

According to an additional embodiment of the invention, at least one of said sides is connected to said bottom via hinges so that the side, either a long side or a short side, can be lowered.

Naturally, the long sides and the short sides may be equally long, but the terminology has been used considering the fact that the sides usually are longer in the longitudinal direction than the sides in the transverse direction.

Plate thicknesses of the bottom and the sides are in the range of 3-10 mm, preferably 4-5 mm, of material grades that correspond to wearing plate. Possibly, the material grade marketed under the trademark HARDOX® may be used.

Also other steel grades may of course be used for the manufacture of a platform body according to the invention. HARDOX® is a registered trademark that is owned by SSAB Oxelösund AB.

For instance, a platform body, having a side thickness of 4 mm and bottom thickness of 5 mm that is 6 m long, 1 m high and 2.5 m wide, has a weight of 1600 kg. This should be compared with a conventional platform body of the corresponding size that weighs 3500 kg.

The bottom plate according to the invention is curved into the intended curvature by roller bending or press braking. The connection parts of the bottom plate are press braked. The joining between the bottom parts or between the bottom part and the side part is made by a screw joint or a welded joint.

When longitudinal supporting beams are used upon great loads, rubber pads are suitably put between the beams and the bottom parts to decrease the stress on the beams. In other cases, just an air gap is used between the bottom part and the beam.

Furthermore, supporting bulkheads may constitute a part of the space between the bottom and the tie means in the form of a plate.

The bottom of the platform body may also be provided with a small angled rear part, a so-called chute, to facilitate loading as well as get a more uniform distribution of bulk goods upon tipping. A suitable angle between the bottom part and the chute is 15°.

BRIEF DESCRIPTION OF THE DRAWINGS

The invention will now be described in more detail by means of embodiment examples, reference being made to the accompanying drawings, wherein FIG. 4 shows an end view of the platform body from behind according to FIG. 1, FIG. 5 shows a section A-A through the platform body according to FIG. 2, FIG. 5a shows an enlargement of the encircled area in FIG. 5, FIG. 6 shows an explanatory sketch of a second embodiment of the present invention, FIG. 7 shows an explanatory sketch of a third embodiment of the present invention, FIG. 8 shows an explanatory sketch of a fourth embodiment of the present invention.

DESCRIPTION OF THE INVENTION

Figure 1:
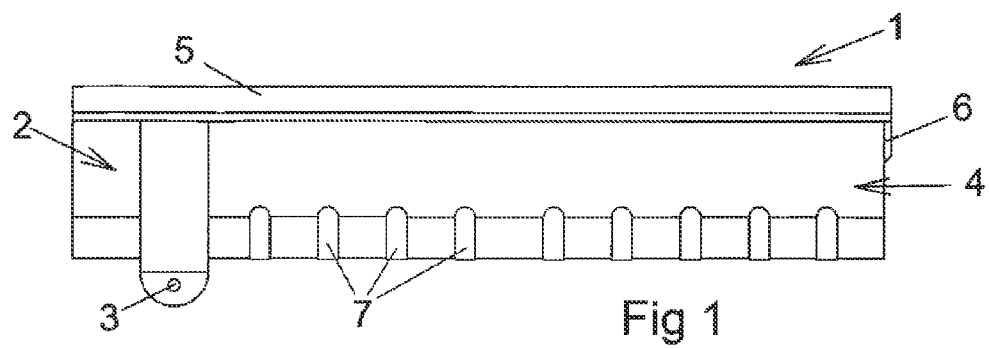
FIG. 1 shows a side view of a platform body according to a first embodiment of the invention.

FIG. 1 shows a platform body 1 having a rear end 2 out of which the goods can be tipped by the platform body being turned by hydraulics around a bearing axis 3. The front end 4 of the platform body is provided with an end wall that is facing a driver's cab, not shown, of the vehicle. The platform body is provided with edge beams 5 as well as an end wall beam 6. In an area near the connection of one of the long sides to the bottom of the platform, the lower edge of the platform body is provided with a number of welded-on tie attachments 7 that extend from the long side downward and in under the bottom of the platform body.

Figure 2:
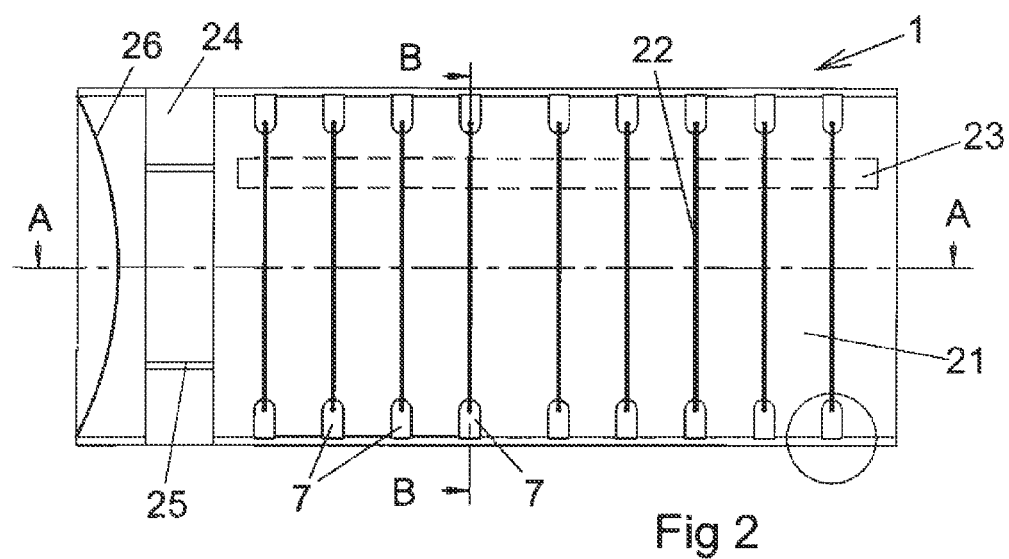
FIG. 2 shows the platform body according to FIG. 1 from the underside.

FIG. 2 shows said tie attachments 7 from the underside of the platform body 1, the attachments 7 being directed inward toward the centre of the platform body in the direction of counter-directed tie attachments on the opposite side of the platform body. In the figure, nine tie attachments are shown on each side of the bottom 21 of the platform body, but naturally the number and placement may be varied within the scope of the invention. To each tie attachment 7, an end of a tie means 22 is connected so that the tie means has an orientation essentially perpendicular to the longitudinal direction of the platform body 1. Furthermore, one or more longitudinal supporting beams 23 may be placed under the bottom of the platform, which has been schematically shown by a beam drawn with dashed lines. The figure also shows a cross beam 24 placed on which bearing seats 25 for the bearing axis are situated. In addition, it is seen that the rear termination of said bottom is made with an arc-shaped reinforcing bending 26.

Figure 2A:
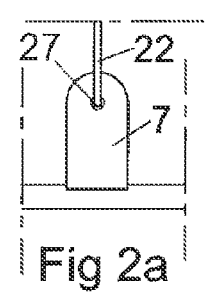
FIG. 2a shows an enlargement of the encircled area in FIG. 2.

FIG. 2a shows a first design of the attachment of the end of the tie means 22 in a tie attachment 7, the tie attachment being provided with a hole 27 through which the end of the tie means is inserted and fixed by, e.g., a screw joint on the upperside of the tie attachment 7.

Figure 3:
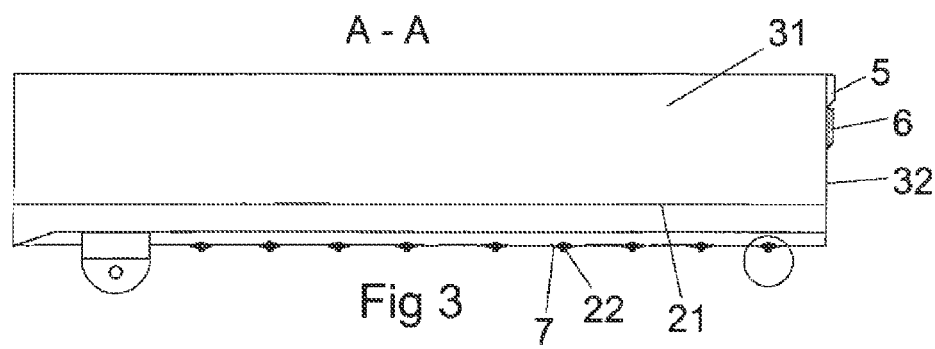
FIG. 3 shows a section B-B through the platform body according to FIG. 2.

FIG. 3 shows a central section through the platform body with the inside of a long side 31 connected to the bottom 21 of the platform by a welded joint. A front end wall 32 is correspondingly connected to both the long side and said bottom. The end wall beam 6 and the edge beam 5 are shown in the figure. In addition, the tie attachments 7 are shown with the tie means 22.

Figure 3A:
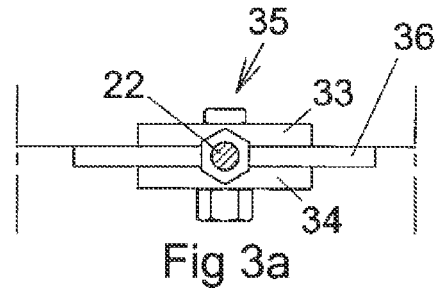
FIG. 3a shows an enlargement of the encircled area in FIG. 3.

FIG. 3a shows an alternative design of the connection of the tie means 22 to the tie attachment. In this embodiment, the outer part of the tie attachment is provided with connection lugs 33, 34 situated on both sides of the attachment and provided with through holes for a screw-nut joint 35 that at the tie attachment locks a coupling washer 36 connected to the tie means 22.

FIG. 4 shows an end view from the rear end of the platform body 1, the bearing seats 25 on the cross beam 24 as well as the curvature of the bottom 21 of the platform body inward toward the cargo volume "LV". By "the cargo volume", reference is made to the volume that is limited by the bottom 21, the sides 41, 42 and the upper edge 43 of the sides. By this curvature, said bottom 21 has a bottom surface of a surface length between the opposite sides 41, 42 of the platform body that is larger than the spacing between said opposite sides. Thus, a downwardly directed force "F" that acts on said bottom 21 can generate outwardly directed forces "$F_1$" and "$F_2$" on the lower portions of the opposite sides 41, 42.

FIG. 5 shows a section taken through the platform body 1 through a tie device 22. The tie device 22 is placed under the bottom 21 of the platform body and connected to the lower parts of the opposite sides 41, 42 to act against a deflection of the sides because of the forces "$F_1$" and "$F_2$". The tie device 22 is connected to a tie attachment 7 via a coupling device that is shown encircled in the figure.

FIG. 5a shows an enlargement of the coupling device that comprises said connection lugs 33, 34 attached in the end of the tie attachment 7. The tie means 22 is connected to the coupling washer 36 that in turn is connected to the tie attachment via the screw 51 and nut 52 of the screw-nut joint 35. The connection between the tie means 22 and the coupling washer 36 consists of a muff coupling 53 that is welded-on onto the coupling washer and connects to the tie device 22 via a jamb nut 54. The figure also shows the bottom 21 of the platform curved inward toward the cargo volume.

FIG. 6 and FIG. 7 show alternative designs of tie means 221, 222 that either can be screwed by a screw joint 61 directly through lower parts to the sides as in FIG. 6, or be integrated and welded to the sides via tie attachments 71. The tie means 221, 222 can either be made as rods, as wires or as plates. In case the tie means is formed as a plate, a channel 62, 72 between the bottom 21 and said plate is formed. The channel may be used to contain hydraulic pipes, cabling, etc. An alternative use of the channel is to introduce exhaust fumes into the same to heat up the bottom with the purpose of eliminating freezing fast of goods residues after tipping. FIG. 6 also shows that a long side 63 may be formed foldable to allow unloading of the goods laterally.

FIG. 8 shows an embodiment of the invention for an extra wide platform body 80, the bottom 21 of which is formed with a first bottom part 81 and a second bottom part 82, which bottom parts are equally large as well as interconnected at the centre of the platform body. Each bottom part 210, 211 is curved inward toward the cargo volume LV. Within the scope of the invention, it is also possible to form one of said bottom parts curved while the other is plane. In addition, it is possible to form the bottom of the platform body with a plurality of co-operating bottom parts, at least one bottom part of which is curved inward toward the cargo volume. Between the side parts 83, 84 of the platform body, one or more tie means 22 are mounted to carry outwardly directed loads on the side parts when the bottom parts are loaded. The design of said tie means may be formed like the tie means that have been previously described.

The embodiment according to FIG. 8 may also be formed with a channel according to FIGS. 6 and 7 and/or be formed with stiffening beams in the longitudinal direction and/or in the transverse direction.

Within the scope of the invention, implementations of an embodiment described above may also be used in another embodiment, for instance, the fixing of the tie means that has been shown in FIGS. 1-3a may alternatively be used in the embodiment according to FIG. 8 instead of the shown screw joint 85.

The invention claimed is:

1. Platform body comprising a bottom to which two opposite sides are connected that either consist of long sides or of short sides as well as at least one additional side for the formation of a cargo volume (LV), said bottom having a bottom surface of a surface length between the opposite sides of the platform body that is larger than the spacing between said opposite sides, at least one part of said bottom being curved inward toward the cargo volume (LV), characterized in that at least one tie means is mounted with one end thereof connected to one of the opposite sides of the platform body and with the other end thereof connected to the other opposite side of the platform body in order to eliminate deflection of said sides when the bottom of the platform body is loaded by goods, the ends of the tie means being connected to the sides of the platform body via a tie attachment connected to the respective side.

2. Platform body according to claim 1, characterized in that one end of the tie means is connected to an area near the connection of one side to the bottom of the platform body, and that the other end of the tie means is connected to an area near the connection of the other side to the bottom of the platform body.

3. Platform body according to claim 1, characterized in that the tie means is placed outside the cargo volume (LV).

4. Platform body according to claim 1, characterized in that the tie attachment extends inward toward the centre of the platform body in the direction of the opposite side.

5. Platform body according to claim 1, characterized in that the tie means is formed either as a tie-rod or as a wire.

6. Platform body according to claim 5, characterized in that the platform body is provided with longitudinal supporting beams through which the tie means extends without any transfer of force between the supporting beam and the tie means.

7. Platform body according to claim 1, characterized in that the tie means is formed as a plate that forms at least one channel between said bottom and said plate.

8. Platform body according to claim 7, characterized in that the channel is closed and arranged for conveying warm exhaust fumes in order to avoid freezing of the transported goods.

9. Platform body according to claim 1, characterized in that said bottom is formed as two bottom parts that are interconnected along the centre of the platform body, each bottom part being curved inward toward the cargo volume (LV).

10. Platform body according to claim 1, characterized in that at least one of said sides is connected to said bottom via hinges so that the side can be lowered.

* * * * *